United States Patent

Peiffer et al.

[11] Patent Number: 6,086,982
[45] Date of Patent: Jul. 11, 2000

[54] BIAXIALLY ORIENTED POLYPROPYLENE FILM HAVING INCREASED DIMENSIONAL STABILITY

[75] Inventors: Herbert Peiffer, Mainz; Detlef Busch, Saarlouis; Gunter Schlögl, Kelkheim; Karl-Heinz Kochem, Bingen; Thomas Dries, Schwabenheim; Andreas Winter, Glashütten, all of Germany

[73] Assignee: Hoechst Aktiengesellschaft, Germany

[21] Appl. No.: 08/966,550

[22] Filed: Nov. 10, 1997

Related U.S. Application Data

[63] Continuation of application No. 08/655,907, May 31, 1996, abandoned.

[30] Foreign Application Priority Data

May 31, 1995 [DE] Germany ............................ 195 19 260
Dec. 27, 1995 [DE] Germany ............................ 195 48 795

[51] Int. Cl.$^7$ .............................. B32B 27/32; C08F 10/06
[52] U.S. Cl. ........................ 428/213; 428/349; 428/515; 428/516; 428/910; 526/348.1; 526/351; 526/943; 364/173.15; 364/235.8; 364/290.2
[58] Field of Search ..................... 428/515, 516, 428/910, 220, 332, 213, 343, 500, 349; 526/348.1, 351, 943; 264/173.15, 290.2, 235.8

[56] References Cited

U.S. PATENT DOCUMENTS

| | | | |
|---|---|---|---|
| 4,622,237 | 11/1986 | Lori | 427/40 |
| 4,668,753 | 5/1987 | Kashiwa et al. | 526/348 |
| 4,975,315 | 12/1990 | Bothe et al. | 428/216 |
| 5,236,622 | 8/1993 | Yoneda et al. | 252/309 |
| 5,236,680 | 8/1993 | Nakazawa et al. | 423/328.1 |
| 5,416,178 | 5/1995 | Winter | 526/160 |
| 5,474,820 | 12/1995 | Murschall et al. | 428/35.7 |
| 5,529,843 | 6/1996 | Dries et al. | 428/336 |

FOREIGN PATENT DOCUMENTS

| | | |
|---|---|---|
| 0 115 940 | 8/1984 | European Pat. Off. . |
| 282917 | 9/1988 | European Pat. Off. . |
| 384263 | 9/1988 | European Pat. Off. . |
| 0 336 127 | 10/1989 | European Pat. Off. . |
| 0 302 424 | 7/1991 | European Pat. Off. . |
| 0 236 945 | 3/1993 | European Pat. Off. . |
| 0 576 970 | 1/1994 | European Pat. Off. . |
| 3801535 | 7/1988 | Germany . |
| 4228812 | 3/1994 | Germany . |
| WO A 9530708 | 11/1995 | WIPO . |

*Primary Examiner*—Paul Thibodeau
*Assistant Examiner*—D. Lawrence Tarazano
*Attorney, Agent, or Firm*—Connolly Bove Lodge & Hutz

[57] ABSTRACT

A biaxially oriented polypropylene film is described. The n-heptane-insoluble content of the film has a chain isotactic index, measured by $^{13}$C-NMR spectroscopy, of at least 97%. In addition, a process for the production of the polypropylene film and the use of the film are described.

19 Claims, No Drawings

BIAXIALLY ORIENTED POLYPROPYLENE FILM HAVING INCREASED DIMENSIONAL STABILITY

This application is a continuation of application Ser. No. 08/655,907, filed on May 31, 1996, now abandoned.

The invention relates to a biaxially oriented, at least single-ply polypropylene film having increased dimensional stability at elevated temperature, to a process for its production and to its use.

Biaxially oriented polypropylene films are known. The films are generally multilayer films produced by coextrusion by the so-called stenter process.

In this process, the polymers are melted and homogenized in extruders. The melts are filtered, and brought together in a slot die, where they are extruded to give the multilayer melt film. The melt film is cast onto a chill roll, where it solidifies to give an unoriented film.

The film is subsequently biaxially oriented by stretching in the longitudinal and transverse directions. After the transverse stretching, the film is cooled to room temperature, and trimmed at both edges, the thickness profile is measured, and, if desired, the film is surface treated. The film is subsequently wound up and packaged to give the cut roll ready for the customer.

The application-relevant properties of boPP films are determined principally by the biaxial orientation. boPP films have high mechanical strengths, good dimensional stability at elevated temperature, a sparkling appearance and excellent flat lying as a consequence of an excellent thickness profile.

On the basis of these good properties and excellent processing properties, boPP films are used in a wide variety of applications. The most important market segment is packaging, which is the destination for about 70% of the amount produced. In addition, boPP films are used in technical applications. Emphasis should be made of metallization, lamination and use of the film as electrical insulation (dielectric) in the production of capacitors.

In technical applications, for example in metallization or when the film is used in the production of capacitors, it is desirable and frequently even necessary that the films have very high dimensional stability, in particular at elevated temperature, i.e. that the thermal shrinkage of the film must be very low, even at elevated temperatures.

Thus, for example during metallization of the films, e.g. capacitor films, elevated temperatures occur on the film surface and thus also in the interior of the film owing to the amount of heat liberated (heat of reaction) during deposition of metal. The increase in temperature in the interior of the film is—for the same metal layer—greater the thinner the film. The trend in this application is toward ever-thinner films. Ten years ago, the mean film thickness was about 9 $\mu$m in this application while today it is significantly below 7 $\mu$m.

Excessive shrinkage of the film as a consequence of elevated film temperatures can result in problems in rolling up the metallized film. If the shrinkage capacity of the film is too high, folds form on the roll and/or the metal layer is damaged.

The situation is similar in the further processing of the metallized film into capacitors. This is generally carried out by cutting the metallized film into narrow strips, which are then converted into round windings. In some applications, these round windings are converted into flat-pressed capacitors. In both cases, electrical contacts are usually provided at the faces of the round or flat windings by soldering or shooping (spraying-on of molten metals at high temperatures). During this, the faces of the film windings can be subjected to considerably higher temperatures. It is disadvantageous here that shrinkage of the film in the longitudinal or transverse direction as a consequence of these elevated temperatures can result in fractures at the contacts and/or partial damage to the metal layer on the film.

Excessive shrinkage is furthermore disadvantageous in capacitor applications in which elevated temperatures can arise in the environment or in the capacitor itself in long-term use and during peak loading.

The above makes it desirable to be able to use films having the lowest possible film shrinkage in the production of capacitors.

In the packaging sector, for example in the wrapping of cigarettes, it may likewise be desirable that the film has the lowest possible thermal shrinkage. During processing of such films, the trend is toward higher machine speeds and lower film thicknesses. In addition, there is a desire for the tightest possible wrapping appearance without folding.

Whereas, in the wrapping of cigarette packs, the cycle speed at which the packs were processed in 1980 was about 250 units/min, today it is about 500 units/min. For cost and environmental reasons, the film thickness has been reduced from the then approximately 20 $\mu$m to about 16 $\mu$m today.

At high machine speeds, the temperature of the heat-sealing jaws must be significantly increased in order to obtain a tightly sealed, aroma-tight wrapping of the cigarette pack, since the heat-sealing times are constantly being shortened further. The thinner the film, the higher the film temperature during this operation.

Excessive shrinkage of the film results, in particular in so-called soft packs, in folds forming during wrapping, which is undesired. In addition, high film shrinkage can cause the pack to become squashed or bent, which is likewise undesired.

In the case of printed standard packaging film, low shrinkage of the film is likewise advantageous. During printing of the film, higher drying temperatures, for example, and thus higher processing speeds can then be used.

In general, the lowest possible shrinkage is always advantageous if shrinkage during heating of the film has adverse effects.

It is known that film shrinkage can be reduced through a suitable choice of the stretching temperatures, in particular those during transverse stretching. To this end, the stretching temperatures and heat-setting temperatures should be chosen to be as high as possible with a long hold time of the film in the tranverse tenter frame. A disadvantageous effect here is that the transparency and gloss of the film are adversely affected, which is undesired. In addition, excessively high stretching temperatures result in a poor thickness profile and lower mechanical strengths.

The object of the present invention was to provide a biaxially oriented polypropylene film which is distinguished by a high dimensional stability at elevated temperature, i.e. very low shrinkage. The shrinkage values should be as low as possible in both directions, i.e. in the machine direction and in the transverse direction. At the same time, the other advantageous properties of the polypropylene film, such as high gloss, low haze, uniform thickness profile, etc., which are required in view of its use as packaging film, should not be impaired. The disadvantages, such as a worse thickness profile or lower economic efficiency owing to increased film tears, should be avoided by carrying out the process separately.

This object is achieved according to the invention by a biaxially oriented polypropylene film having at least one base ply which contains polypropylene, wherein the polypropylene used in the base ply is one whose characteristic features are that the mean isotactic block length of the polypropylene molecule between two structural chain defects is, as a statistical average, greater than 40, the n-heptane-insoluble fraction of the polypropylene has a chain isotactic index of at least 95%, measured by means of $^{13}$C-NMR spectroscopy, the ratio of the weight average $M_W$ to the number average $M_n$ as a molecular weight distribution of less than 4 and the n-heptane-soluble fraction of the polypropylene is less than 1%, and the shrinkage of the film in the longitudinal and transverse direction is less than 5%.

Preferred embodiments of the invention, are additionally explained below.

According to the invention, the film may be multilayer or single-ply and is then composed only of the base ply described below. For the purposes of the present invention, the base ply is that ply which has the greatest thickness of all plies present. In general, the base ply in multilayer embodiments accounts for at least 40%, preferably 50 to 98%, of the total film thickness. In the multilayer embodiment, the film has, on its base ply, at least one top ply or if required top plies on both sides, which form the outer plies of the film. In a further multilayer embodiment, the film has on its base ply at least one interlayer or if required interlayers on both sides.

The base ply of the film contains in general at least 85–100% by weight, preferably 90–99% by weight, in particular 90–95% by weight, based in each case on the base ply of a propylene polymer described below, which differs substantially in structure from the conventional isotactic propylene polymers which are usually used in the base ply of boPP films. These structural differences can be achieved by the preparation of the propylene polymers by means of novel metallocene catalysts.

A feature of this structural difference is a mean isotactic block length of propylene polymer between two structural chain defects of at least 40, preferably at least 60 and in particular at least 70 propylene units.

The polypropylene used according to the invention may be characterized by means of further parameters which are associated with the particular structure of the polymer.

In addition to a defined mean isotactic block length, the polypropylene is distinguished by a particularly low n-heptane-soluble fraction which is in general less than 1.0% by weight, preferably >0 to 0.6% by weight and in particular is in the range from 0.5 to 0.005% by weight, based in each case on the weight of the starting polymer.

The n-heptane-insoluble fraction of the propylene polymer is in general highly isotactic. The chain isotactic index, determined by means of $^{13}$C-NMR spectroscopy, of the n-heptane-insoluble fraction is at least 95%, preferably at least 96% and in particular at least 97 to 99%.

The molecular weight distribution is a further suitable parameter for characterizing the polymer structure. It is advantageously comparatively narrow. The ratio of the weight average $M_W$ to the number average $M_n$ is preferably less than 4, especially less than 3. It is in particular in the range from 1.5 to 2.7.

It was completely surprising that, in spite of the extremely low n-heptane-soluble fraction, the high chain isotactic index and the very narrow molecular weight distribution, these novel polypropylenes can be stretched to give biaxially oriented polypropylene films. Furthermore, it was very surprising that the films produced from the novel polymer have substantially improved dimensional stability.

It has been found that the structural differences of the polypropylene which are due to its preparation by means of a metallocene catalyst are advantageous for the dimensional stability of the film, i.e. advantageous for lower shrinkage at increased temperature. The shrinkage in the longitudinal and transverse directions is substantially lower in the case of films having a base ply comprising metallocene PP than in the case of films comprising general purpose PP.

The propylene polymer having the structure described above contains in general at least 90% by weight, preferably 94 to 100% by weight, in particular 98 to 100% by weight, of propylene units. The corresponding comonomer content of not more than 10% by weight or 0 to 6% by weight or 0 to 2% by weight comprises, where present, in general ethylene. The data in % by weight are based in each case on the propylene polymer. The melting point is in general in the range from 140 to 175° C., preferably from 150 to 165° C. and in particular from 155 to 162° C., and the melt flow index (measurement according to DIN 53 735 at 21.6N load and 230° C.) is 1.0 to 30 g/10 min, preferably from 1.5 to 20 g/10 min and in particular 2.0 to 16 g/10 min.

The polypropylene described above can advantageously be prepared by processes known per se in which metallocene catalysts are used. The preparation of these polyolefins is not the subject of the present invention. The corresponding processes have already been described in EP-A-0 302 424, EP-A-0 336 128 and EP-A-0 336 127 and EP-A-0 576 970, which are hereby incorporated by reference.

The conventional Ziegler-Natta catalysts have a plurality of different polymerization-active centers, each of which prepares a different polymer. This leads to chains having very different molecular weights. In practice, both waxy polymers having chain lengths $M_n$ of less than 10,000 and ultra high molecular weight polymers having an $M_n$ greater than 1,000,000 are obtained. At the same time, the active centers vary in their stereospecificity. The spectrum ranges from completely unspecific centers through syndiospecific centers to isospecific centers, the latter in turn having different isospecificity. This leads to a product mixture comprising atactic polypropylene, syndiotactic polypropylene and isotactic polypropylene having different crystallinities, i.e. having different melting points. Syndiotactic polypropylene leads to warping of the film, atactic polypropylene to exudation and a reduction in the film hardness and isotactic polypropylene is a material having different melting points, i.e. is not a uniform product.

Small fluctuations in the polymerization conditions lead to fluctuations in the composition of the three characteristic chain types, i.e. once again to a different product which cannot be uniquely characterized.

On the other hand, the metallocene catalysts have a polymerization center which can be uniquely characterized to respective desirable polymer types by variation of the metallocene-ligand sphere. The distribution of the chain length is uniform. The $M_w/M_n$ is small and between 1.7 and 4.0, preferably between 1.8 and 3.0 and very particularly between 2.0 and 2.7 (Schultz-Florey distribution). Furthermore, the active centers also have a uniform stereospecificity, which leads to chains having a uniform melting point or chains having uniform stereospecific structure. Thus, polymer chains which differ only slightly in their mean isotactic block lengths are formed. This is also reflected in a uniform melting point.

The base ply of the film according to the invention can, if required, contain conventional additives in respective effective amounts in addition to the metallocene propylene polymer described above. Conventional additives are antiblocking agents, neutralizing agents, stabilizers, antistatic agents and/or lubricants.

Preferred antistatic agents are alkali metal alkanesulfonates, polyether-modified, i.e. ethoxylated and/or propoxylated polydiorganosiloxanes (polydialkylsiloxanes, polyalkylphenylsiloxanes and the like) and/or the essentially straight-chain and saturated aliphatic, tertiary amines which have an aliphatic radical having 10 to 20 carbon atoms and are substituted by ω-hydroxy-($C_1$–$C_4$)-alkyl groups, N,N-bis-(2-hydroxyethyl)-alkylamines having 10 to 20 carbon atoms, preferably 12 to 18 carbon atoms, in the alkyl radical being particularly suitable. The effective amount of antistatic agent is in the range from 0.05 to 0.5% by weight. Furthermore, glyceryl monostearate is preferably used as an antistatic agent, in an amount of 0.03% to 0.5%.

Suitable antiblocking agents are inorganic additives, such as silica, calcium carbonate, magnesium silicate, aluminum silicate, calcium phosphate and the like, and/or incompatible organic polymers, such as polyamides, polyesters, polycarbonates and the like, preferably benzoguanamine/formaldehyde polymers, silica and calcium carbonate. The effective amount of antiblocking agent is in the range from 0.1 to 2% by weight, preferably 0.1 to 0.8% by weight. The mean particle size is between 1 and 6 μm, in particular 2 and 5 μm, particles having a spherical shape, as described in EP-A-0 236 945 and DE-A-38 01 535, being particularly suitable.

Lubricants are higher aliphatic amides, higher aliphatic esters, waxes and metal soaps as well as polydimethylsiloxanes. The effective amount of lubricant is in the range from 0.01 to 3% by weight, preferably 0.02 to 1% by weight. The addition of higher aliphatic amides in the range from 0.01 to 0.25% by weight to the base ply is particularly suitable. A particularly suitable aliphatic amide is erucamide. The addition of polydimethylsiloxanes in the range from 0.02 to 2.0% by weight is preferred, in particular polydimethylsiloxanes having a viscosity from 5,000 to 1,000,000 $mm^2$/S.

The stabilizers used can be the conventional compounds having a stabilizing action for ethylene polymers, propylene polymers and other α-olefin polymers. The added amount thereof is between 0.05 and 2% by weight. Phenolic stabilizers, alkali metal stearates/alkaline earth metal stearates and/or alkali metal carbonates/alkaline earth metal carbonates are particularly suitable. Phenolic stabilizers in an amount from 0.1 to 0.6% by weight, in particular 0.15 to 0.3% by weight, and with a molecular mass of more than 500 g/mol are preferred. Pentaerythrityl tetrakis-3-(3,5-ditertiary-butyl-4-hydroxyphenyl)-propionate or 1,3,5-trimethyl-2,4,6-tris(3,5-di-tertiary-butyl-4-hydroxybenzyl)benzene are particularly advantageous.

Neutralizing agents are preferably dihydrotalcite, calcium stearate and/or calcium carbonate having a mean particle size of at most 0.7 μm, an absolute particle size of less than 10 μm and a specific surface area of at least 40 $m^2$/g.

In a preferred multilayer embodiment, the polypropylene film according to the invention comprises at least one top ply or if necessary top plies on both sides, composed of polymers of α-olefins having 2 to 10 carbon atoms. In general, the top ply contains at least 70% by weight, preferably 80 to 100% by weight, in particular 90 to 98% by weight, of the α-olefinic polymers, based in each case on the weight of the top ply and any additives in effective amounts in each case.

Examples of such α-olefinic polymers are
a propylene homopolymer or
a copolymer of
ethylene and propylene or
ethylene and 1-butylene or
propylene and 1-butylene or
a terpolymer of
ethylene and propylene and 1-butylene or
a mixture of two or more of the stated homo-, co- and terpolymers or
a blend of two or more of the stated homo-, co- and terpolymers, if necessary mixed with one or more of the stated homo-, co- and terpolymers,
in particular a propylene homopolymer or
a random ethylene/propylene copolymer having
an ethylene content of 1 to 10% by weight, preferably 2.5 to 8% by weight, or
a random propylene/1-butylene copolymer having
a butylene content of 2 to 25 % by weight, preferably 4 to 20% by weight,
based in each case on the total weight of the copolymer, or
a random ethylene/propylene/1-butylene terpolymer having
an ethylene content of 1 to 10% by weight, preferably 2 to 6% by weight, and
a 1-butylene content of 2 to 20% by weight, preferably 4 to 20% by weight,
based in each case on the total weight of the terpolymer, or
a blend of an ethylene/propylene/1-butylene terpolymer and a propylene/1-butylene copolymer
having an ethylene content of 0.1 to 7% by weight
and a propylene content of 50 to 90% by weight and a 1-butylene content of 10 to 40% by weight,
based in each case on the total weight of the polymer blend,
being preferred.

The propylene homopolymer used in the top ply has a melting point of 140° C. or higher, preferably 150 to 165° C. Isotactic homopolypropylene having an n-heptane-soluble fraction of 6% by weight or less, based on the isotactic homopolypropylene, is preferred. The homopolymer has in general a melt flow index of 1.0 g/10 min to 20 g/10 min.

The copolymers and terpolymers preferably used in the top ply and described above have in general a melt flow index of 1.5 to 30 g/10 min. The melting point is preferably in the range from 120 to 140° C. The blend of copolymer and terpolymer, described above, has a melt flow index of 5 to 9 g/10 min and a melting point of 120 to 150° C. All melt flow indices stated above are measured at 230° C. and under a force of 21.6N (DIN 53 735).

In a dull embodiment, the top ply additionally contains a high density polyethylene (HDPE) which is mixed or blended with the top ply polymers described above. The composition and details of the dull top plies are described, for example, in EP 0 563 796 or EP 0 622, which are incorporated herein by reference.

The top ply or plies may also contain the metallocene-catalyzed propylene polymer described above for the base ply.

If required, the additives described above for the base ply, such as antistatic agents, antiblocking agents, lubricants, neutralizing agents and stabilizers, may be added to the top ply or top plies. The stated amounts in these above embodiments are based on the corresponding weight of the top ply.

In a preferred embodiment, the top ply or plies contains or contain a combination of anti-blocking agent, preferably $SiO_2$, and lubricant, preferably polydimethylsiloxane.

The film according to the invention comprises at least the base ply described above, preferably at least one top ply. Depending on its intended use, the film may have a further top ply on the opposite side. If required, an interlayer or interlayers can be applied on one or both sides between the base ply and the top ply or plies.

Preferred embodiments of the polypropylene film according to the invention are three-ply. The structure, thickness and composition of a second top ply can be chosen independently of the top ply already present, and the second top ply may likewise contain one of the polymers or polymer mixtures which are described above but which need not be identical to that of the first top ply. The second top ply may, however, also contain other conventional top ply polymers.

The thickness of the top ply or plies is generally greater than 0.1 μm and is preferably in the range from 0.1 to 10 μm, preferably in the range from 0.3 to 3 μm, in particular 0.4 to 1.5 μm, and top plies on both sides may be of equal or different thickness.

The interlayer or interlayers may comprise the α-olefinic polymers described for the top plies. In a preferred embodiment, the interlayer or interlayers comprises or comprise the propylene polymer described for the base ply. The interlayer or interlayers may contain the conventional additives described for the individual plies. The thickness of the interlayer or interlayers is generally greater than 0.3 μm and is preferably in the range from 1.0 to 15 μm, in particular 1.5–10 μm.

The total thickness of the polypropylene film according to the invention may vary within wide limits and depends on the intended use. It is preferably 4 to 100 μm, in particular 5–60 μm, preferably 6–30 μm, the base ply accounting for about 40 to 100% of the total film thickness.

The invention furthermore relates to a process for producing the polypropylene film according to the invention by the coextrusion process known per se.

In this process, the melt or melts corresponding to the ply or to the individual plies of the film is or are co-extruded through a flat die, the film thus obtained is drawn off on one or more rollers for solidification, the film is then biaxially stretched (oriented) and the biaxially stretched film is thermofixed and, if required, corona-treated or flame-treated on the surface ply intended for treatment.

The biaxial stretching (orientation) is generally carried out successively, the successive biaxial stretching, in which stretching is first carried out longitudinally (in the machine direction) and then transversely (perpendicular to the machine direction), being preferred.

Firstly, the polymer or the polymer mixture of the individual plies is compressed and liquefied in an extruder, as is usual in the coextrusion process, and the additives added if required may already be present in the polymer or in the polymer mixture. The melts are then simultaneously forced through a slot die (flat film die), and the extruded multilayer film is drawn off on one or more draw-off rollers, during which it cools and solidifies.

The film thus obtained is then stretched longitudinally and transversely relative to the extrusion direction, which leads to orientation of the molecular chains. The longitudinal stretching is expediently carried out with the aid of two rollers running at different speeds corresponding to the desired stretching ratio, and the transverse stretching is carried out with the aid of an appropriate tenter frame. The longitudinal stretching ratios are in the range from 3 to 9, preferably 4.5–8.5. The transverse stretching ratios are in the range from 4 to 12, preferably 5–11, in particular 7 to 10.

The biaxial stretching of the film is followed by its heat setting (heat treatment), the film being kept for about 0.1 to 10 s at a temperature of 100 to 160° C. The film is then wound up in the usual manner by means of a winding device.

It has proved to be particularly advantageous to keep the draw-off roller or rollers, by means of which the extruded film is cooled and solidified, at a temperature of 10 to 100° C., preferably 20–70° C., by a heating and cooling circulation.

The temperatures at which longitudinal and transverse stretching are carried out may be varied within a relatively wide range and depend on the desired properties of the film. In general, longitudinal stretching is preferably carried out at 80 to 170° C., preferably 80–150° C. and transverse stretching preferably at 100 to 200° C., preferably 120–170° C.

After the biaxial stretching, one or both surfaces of the film are preferably corona-treated or flame-treated by one of the known methods. The intensity of treatment is in general in the range from 37 to 50 mN/m, preferably 39 to 45 mN/m.

In an expedient corona treatment, the film is passed between two conductor elements serving as electrodes, such a high voltage, in most cases alternating voltage (about 5 to 20 kV and 5 to 30 kHz), being applied between the electrodes that spray discharges or corona discharges can take place. Due to the spray discharge or corona discharge, the air above the film surface is ionized and reacts with the molecules of the film surface so that polar spots are formed in the essentially nonpolar polymer matrix.

For a flame treatment with a polarized flame (cf. U.S. Pat. No. 4,622,237), a direct electric voltage is applied between a burner (negative pole) and a cooling roller. The level of the applied voltage is between 400 and 3,000 V, preferably in the range from 500 to 2,000 V. Owing to the applied voltage, the ionized atoms experience increased acceleration and impinge at higher kinetic energy on the polymer surface. The chemical bonds within the polymer molecule are more readily broken, and the formation of free radicals proceeds more rapidly. The thermal stress on the polymer is in this case far less than in the standard flame treatment, and films can be obtained in which the sealing properties of the treated side are even better than those of the untreated side.

The novel film having a base ply comprising metallocene PP is distinguished by very low shrinkage values, in particular in the longitudinal direction (machine direction). The shrinkage values in the longitudinal direction and in the transverse direction are less than 5%, preferably less than 3% and in particular less than 2%.

The following methods of measurement were used for characterizing the raw materials and the films:

Shrinkage

The longitudinal and transverse shrinkage values relate to the respective increase in dimensions of the film (longitudinal $L_0$ and transverse $Q_0$) before the shrinking process. The longitudinal direction is the machine direction, and the transverse direction is defined correspondingly as the direction transverse to the machine run. The test specimen is subjected to a temperature of 120° C. for 5 minutes in a circulating-air oven. After the test specimen has cooled completely, the increases in dimensions in the longitudinal and transverse directions are subsequently re-determined ($L_1$ and $Q_1$). The shrinkage is then given as the difference between the increase in dimensions determined compared with the original dimension $L_0$ and $Q_0$.

$$\text{Longitudinal shrinkage } L_s = \frac{L_0 L_1}{L_0}$$

-continued $$\text{Transverse shrinkage } Q_s = \frac{Q_0 Q_1}{Q_0}$$

This determination method for longitudinal and transverse shrinkage corresponds to DIN 404 34.

Melt Flow Index

The melt flow index was measured according to DIN 53 735 at 21.6N load and 230° C.

Melting Point

DSC measurement, maximum of the melting curve, heating rate 20° C./min.

Water Vapor and Oxygen Transmission

The water vapor transmission is determined according to DIN 53 122 Part 2. The oxygen barrier effect is determined according to Draft DIN 53 380 Part 3 at an atmospheric humidity of 53%.

Haze

The haze of the film was measured according to ASTM-D 1003-52.

Gloss

The gloss was determined according to DIN 67 530. The reflector value was measured as an optical characteristic of the surface of a film. Analogously to the standards ASTM-D 523-78 and ISO 2813, the angle of incidence was set at 60 or 85. At the set angle of incidence, a light beam strikes the planar test surface and is reflected or scattered by the latter. The light beams incident on the photoelectronic receiver are indicated as a proportional electric value. The measured value is dimensionless and must be quoted with the angle of incidence.

Surface Tension

The surface tension was determined by means of the so-called ink method (DIN 53 364).

Printability

The corona-treated films were printed on 14 days after their production (short-term evaluation) or 6 months after their production (long-term evaluation). The ink adhesion was evaluated by means of the self-adhesive tape test. The ink adhesion was rated as moderate if little ink could be removed by means of self-adhesive tape and was rated as poor if a substantial amount of ink could be removed.

Tensile Strength, Elongation at Break

The tensile strength and the elongation at break are determined according to DIN 53455.

Modulus of Elasticity

The modulus of elasticity is determined according to DIN 53 457 or ASTM 882.

Determination of the High-Temperature Blocking Characteristics

To measure the high-temperature blocking characteristics, two wooden blocks adhesively bonded to felt on one side and having the dimensions 72 mm×41 mm×13 mm are wrapped and sealed in the film to be measured. A weight of 200 g is placed on the wooden blocks positioned so that the felt coverings face one another, and this set-up is introduced into a heating oven preheated to 70° C. and is left there for 2 hours. Thereafter, cooling is effected for 30 minutes to room temperature (21° C.), the weight is removed from the wooden blocks and the upper block is pulled off the lower block by means of a mechanical apparatus. The evaluation is effected over 4 individual measurements, from which a maximum pull-off force (measured in N) is then determined. The specification is met if none of the individual measurements is above 5N.

Molecular Weight Determination

The average molecular weight $M_w$ and $M_N$ (average weight $M_w$ and average number $M_n$) and the mean inhomogeneity of the molecular mass were determined analogously to DIN 55 672, Part 1, by means of gel permeation chromatography. Instead of THF, ortho-dichlorobenzene was used as the eluant. Since the olefinic polymers to be investigated are not soluble at room temperature, the entire measurement is carried out at an elevated temperature (135° C.).

Isotactic Content

The isotactic content of the homopolymer and also the isotactic content of the film can be characterized approximately by means of the insoluble fraction of the raw material or of the film in a suitable solvent. It has proven expedient to use n-heptane. Usually, a Soxhlet extraction with boiling n-heptane is carried out. In order to obtain good reproducibility, it is expedient to fill the Soxhlet apparatus with a compact instead of granules. The thickness of the compact should not exceed 500 micrometers. For the quantitative determination of the atactic content of the polymer, it is of decisive importance to ensure sufficient extraction time. As a rule, the extraction time is in the range from 8 to 24 hours.

The operational definition of the isotactic content $PP_{iso}$ in percent is given by the ratio of the weights of the dried n-heptane-insoluble fraction to the sample weight:

$PP_{iso}=100\times(\text{n-heptane-insuluble fraction/sample weight})$

An analysis of the dried n-heptane extract shows that, as a rule, it does not comprise pure atactic propylene polymer. In the extraction, aliphatic and olefinic oligomers, in particular isotactic oligomers, and also possible additives, such as, for example, hydrogenated hydrocarbon resins, are also measured.

Chain Isotactic Index

The isotactic content $PP_{iso}$ defined above is not sufficient for characterizing the chain isotacticity of the polymer. It proves to be useful to determine the chain isotactic index II of the propylene polymer by means of high-resolution $^{13}$C-NMR spectroscopy, the NMR sample chosen being not the original raw material but its n-heptane-insoluble fraction. To characterize the isotacticity of polymer chains, $^{13}$C-NMR spectroscopic triad isotactic index II (triads) is used in practise.

Determination of the Triad-Related Chain Isotactic Index II (Triads)

The chain isotactic index II (triads) of the n-heptane-insoluble content of the polymer and of the film is determined from the $^{13}$C-NMR spectrum of said homopolymer or of said film. The intensities of triad signals which result from the methyl groups with different local environments are compared.

With regard to the evaluation of the $^{13}$C-NMR spectrum, a distinction must be made between two cases:

A) The raw material investigated is a pure propylene homopolymer without a random $C_2$ content.
B) The raw material investigated is a propylene polymer having a low random $C_2$ content, referred to below as $C_2$–$C_3$-copolymer.

Case A

The chain isotactic index of the homopolymer is determined from its $^{13}$C-NMR spectrum. The intensities of the signals which result from the methyl groups with different environments are compared. In the $^{13}$C-NMR spectrum of a homopolymer, essentially three groups of signals, so-called triads, occur.

1. At a chemical shift of about 21 to 22 ppm, the "mm-triad" occurs and is assigned to the methyl groups having methyl groups directly adjacent on the left and right.

2. At a chemical shift of about 20.2 to 21 ppm, the "mr-triad" occurs and is assigned to the methyl groups having methyl groups directly adjacent on the left or right.
3. At a chemical shift of about 19.3 to 20 ppm, the "mr-triad" occurs and is assigned to the methyl groups without directly adjacent methyl groups.

The intensities of the signal groups assigned are determined as the integral of the signals. The chain isotactic index is defined as follows:

$$\text{II triads} = \frac{J_{mm} + 0.5 J_{mr}}{J_{mm} + J_{mr} + J_{rr}} \cdot 100$$

where $J_{mm}$, $J_{mr}$ and $J_{rr}$ are the integrals of the signal groups assigned.

Case B

FIG. 1 is a schematically enlarged representation of a $^{13}$C-NMR spectrum of an ethylene/propylene copolymer. The chemical shift of the methyl groups of interest is in the range from 19 to 22 ppm. As can be seen in FIG. 1, the spectrum of the methyl groups can be divided into three blocks. In these blocks, the $CH_3$ groups appear in triad sequences, whose assignment to the local environments is explained in detail below:

Block 1:

$CH_3$ groups in the PPP sequence (mm-triad)

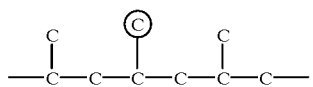

Block 2:

$CH_3$ groups in the PPP sequence (mr- or rm-triads)

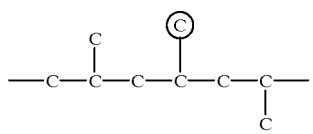

and $CH_3$ groups in the EPP sequence (m-chain):

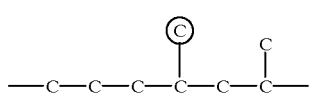

Block 3:

$CH_3$ groups in the PPP sequence (rr-triads):

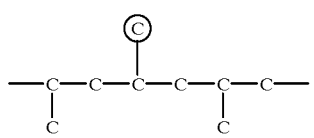

$CH_3$ groups in an EPP sequence (r-chain):

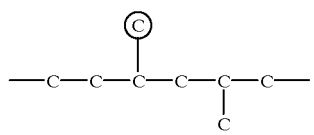

$CH_3$ groups in an EPE sequence:

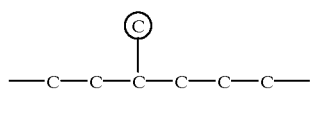

In the determination of the triad-related chain isotactic index II (triads) of the n-heptane-insoluble content of an ethylene/propylene copolymer, only PPP triads were considered, i.e. only those propylene units which are present between two adjacent propylene units (cf. also EP-B-0 115 940, page 3, lines 48 and 49).

The definition of the triad isotactic index of an ethylene/propylene copolymer is:

$$\text{II (triads)} = 100 \times (J_{mm}/J_{PPP})$$

Calculation of the chain isotactic index of an ethylene/propylene copolymer:

1. $J_{mm}$ is given by the peak integral of block 1.
2. Calculate the integral ($J_{total}$) of all methyl group peaks in blocks 1, 2 and 3.
3. By simple considerations, it is possible to show that $J_{PPP} = J_{total} - J_{EPP} - J_{EPE}$.

Sample Preparation and Measurement 60 to 100 mg of polypropylene are weighed into a 10 mm NMR tube, and hexachlorobutadiene and tetrachloroethane in a ratio of about 1.5:1 are added until a fill height of about 45 mm is reached. The suspension is stored at about 140° C. until (as a rule about one hour) a homogeneous solution has formed. In order to accelerate the dissolution process, the sample is stirred from time to time with a glass rod.

The $^{13}$C-NMR spectrum is recorded at an elevated temperature (as a rule 365K) under standard measuring conditions (semiquantitatively).

Mean Isotactic Block Length $n_{iso}$

The mean isotactic block length $n_{iso}$ is determined from the $^{13}$C-NMR spectrum according to the formula $$n_{iso} = 1 + 2 J_{mm}/J_{mr}.$$

Preparation of the Propylene Polymers

The propylene polymers were prepared with the aid of metallocene catalysts by the polymerization reactions described by way of example below:

EXAMPLE 1

A dry reactor having the capacity of 150 dm$^3$ was flushed with nitrogen and filled, at 20° C., with 80 dm$^3$ of a naphtha cut having a boiling range of from 100 to 120° C. The gas space was then flushed free from nitrogen by 5 flushing operations with propylene under a pressure of 2 bar and decompression.

After the addition of 50 l of liquid propylene, 64 cm$^3$ of solution of methylaluminoxane in toluene (corresponding to 100 mmol of Al, molecular weight according to cryoscopic determination 1000 g/mol) were added and the reactor content was heated to 50° C. Hydrogen content in the gas space of the reactor of 1.2% was established by metering in hydrogen and was subsequently kept constant by further metering during the entire polymerization time (checking on-line by gas chromatography.

20 mg of the metallocene rac-dimethylsilanediylbis-(2-methyl-4,6-diisopropyl-1-indenyl) zirconiumdichloride were dissolved in 16 ml of a solution of methyl-aluminoxane in toluene (corresponding to 25 mmol of Al) and were added to the reactor.

The reactor was kept at 50° C. for 10 hours by cooling, after which the polymerization was stopped by adding 50 dm$^3$ (S.T.P.) of $CO_2$ gas and the polymer formed was separated off from the suspension medium and was dried.

21.9 kg of polymer powder, corresponding to a metallocene activity of 109.5 kg PP/g metallocene * h were obtained. The polymer is characterized by the following further data:

| | |
|---|---|
| Viscosity VN: | 228 cm$^3$/g |
| Average molecular weight $M_w$: | 225 000 g/mol |
| $M_w/M_n$: | 2.5 |
| Melting point $T_m$: | 150° C. |
| Melt flow index MFI: | 7.0 g/10 min |
| Mean isotactic block length $n_{iso}$: | about 80 |
| Isotactic index: | about 97.5% |

EXAMPLE 2

The polymerization of Example 1 was repeated, but the metallocene rac-dimethylsilanediylbis(2-methyl-4,5-benzo-1-indenyl)zirconium dichloride was used. The polymerization temperature was 60° C., and polymerization was carried out for 6.5 hours. The metallocene activity in this case was 173 kg PP/g metallocene * h. The polymer is characterized by the further data as follows:

| | |
|---|---|
| Viscosity VN: | 258 cm$^3$/g |
| Average molecular weight $M_w$: | 302 000 g/mol |
| $M_w/M_n$: | 2.3 |
| Melting point $T_m$: | 147° C. |
| Melt flow index MFI: | 4.3 g/10 min |
| Mean isotactic block length $n_{iso}$: | about 80 |
| Isotactic index: | about 97.5% |

EXAMPLE 3

The polymerization of Example 1 was repeated, but 10 mg of the metallocene rac-dimethylsilanediylbis(2-methyl-4-phenyl-1-indenyl)zirconium dichloride were used. The hydrogen concentration in the gas space of the reactor was 1.8% by volume. The metallocene activity was 227 kg PP/g metallocene * h. The polymer is characterized by the further data as follows:

| | |
|---|---|
| Viscosity VN: | 230 cm$^3$/g |
| Average molecular weight $M_w$: | 274 500 g/mol |
| $M_w/M_n$: | 2.0 |
| Melting point $T_m$: | 160° C. |
| Melt flow index MFI: | 4.0 g/10 min |
| Mean isotactic block length $n_{iso}$: | about 100 |
| Isotactic index: | about 98% |

EXAMPLE 4

The procedure was as in Example 1, but two different hydrogen concentrations were used during the polymerization. First, a hydrogen content of 10% by volume was established in the gas space of the reactor and was kept constant by subsequent metering until the propylene pressure in the reactor had fallen to 6 bar as a result of polymerization of propylene. The hydrogen was then reduced to 1.0% by volume by briefly releasing gas, and the polymerization was continued at this hydrogen concentration.

10 mg of the metallocene rac-dimethylsilanediylbis(2-ethyl-4-phenyl-1-indenyl)zirconium dichloride were dissolved in 16 ml of solution of methylaluminoxane in toluene (corresponding to 25 mmol of Al) and were added to the reactor.

16.2 kg of polymer powder, corresponding to a metallocene activity of 162 kg PP/g metallocene * h, were obtained. The polymer is characterized by the following further data:

| | |
|---|---|
| Viscosity VN: | 245 cm$^3$/g |
| Average molecular weight $M_w$: | 358 000 g/mol |
| $M_w/M_n$: | 3.0 |
| Melting point $T_m$: | 161° C. |
| Melt flow index MFI: | 4.6 g/10 min |
| Mean isotactic block length $n_{iso}$: | about 100 |
| Isotactic index: | about 98% |

Production of the Films

EXAMPLE 5

A transparent single-ply film having a total thickness of 5 μm was produced by stepwise orientation in the longitudinal and transverse directions. The raw material used for the film was:

| | |
|---|---|
| 99.85% by weight | of highly isotactic polypropylene from Hoechst AG |
| 0.15% by weight | of stabilizer |

The polypropylene homopolymer was produced as described in Example 3. The production conditions in the individual process steps were:

| | | |
|---|---|---|
| Extrusion: | Temperatures | 280° C. |
| Longitudinal stretching: | Temperature: | 115° C. |
| Transverse stretching: | Temperature: | 160° C. |
| | Transverse stretching ratio: | 11 |
| Setting: | Temperature: | 150° C. |
| | Convergence: | 15% |

The film produced in this manner had the properties listed in the Table (first line: Example 5).

EXAMPLE 6

A transparent three-ply film having a symmetrical structure and a total thickness of 16 μm was produced by coextrusion and subsequent stepwise orientation in the longitudinal and transverse direction. The top plies each had a thickness of 0.6 μm.

| A-base ply: | |
|---|---|
| 99.85% by weight | of highly isotactic polypropylene from Hoechst AG |
| 0.15% by weight | of antistatic agent |

The polypropylene of the base raw material was prepared according to Example 3.

| B-top plies: | |
|---|---|
| 98.77% by weight | of a random ethylene/propylene copolymer having a $C_2$ content of 4.5% by weight |
| 0.33% by weight | of an antiblocking agent, having a mean particle size of 2 μm |
| 0.90% by weight | of a lubricant |

The production conditions in the individual process steps were:

| | | | |
|---|---|---|---|
| Extrusion: | Temperatures | A-ply: | 280° C. |
| | | B-ply: | 280° C. |
| Longitudinal stretching: | Temperature: | | 140° C. |
| | Longitudinal stretching ratio: | | 3.5 |
| Transverse stretching: | Temperature: | | 160° C. |
| | Transverse stretching ratio: | | 11 |
| Setting: | Temperature: | | 150° C. |
| | Convergence: | | 15% |

The film produced in this manner had the properties listed in the Table (Example 6).

Comparative Example 1

In comparison with Example 5, a commercial polypropylene from Hoechst AG was used. The n-heptane-soluble fraction of the film had a chain isotactic index of 93%, measured by means of $^{13}$C-NMR spectroscopy. The $M_w/M_n$ was 4.5 and the n-heptane-soluble fraction was 4% by weight.

the n-heptane-insoluble fraction of the polypropylene has a chain isotactic index of at least 95%, measured by means of $^{13}$C-NMR spectroscopy, the ratio of the weight average $M_w$ to the number average $M_n$ of the molecular weight distribution is less than 4, the n-heptane-soluble fraction of the polypropylene is less than 1%, and the shrinkage of the film in the longitudinal direction and in the transverse direction is less than 5%.

2. The single ply film as claimed in claim 1, wherein the single ply contains a polypropylene whose n-heptane-insoluble fraction has a chain isotactic index, measured by means of $^{13}$C-NMR spectroscopy, of at least 96%.

3. The single ply film as claimed in claim 1, wherein the single ply contains a polypropylene whose $M_w/M_n$ is less than 3.0.

4. The single ply film as claimed in claim 1, wherein the single ply contains an antistatic agent.

5. The single ply film as claimed in claim 1, wherein the single ply contains a neutralizing agent.

6. The single ply film as claimed in claim 1, wherein the single ply contains a stabilizer.

7. The single ply film as claimed in claim 1, wherein the single ply contains a lubricant.

8. The single ply film as claimed in claim 1, wherein the single ply contains an antiblocking agent.

9. The single ply film as claimed in claim 1, in the form of a packaging film.

10. The single ply film as claimed in claim 1, in the form of a laminating film.

11. A biaxially oriented polypropylene film, which has at least one base ply which contains polypropylene, wherein the mean isotactic block length of the polypropylene molecule between two structural chain defects is, as a statistical average, greater than 40, the n-heptane-insoluble fraction of the polypropylene has a chain isotactic index of at least 95%, measured by means of $^{13}$C-NMR spectroscopy, the ratio of the weight average $M_w$ to the number average $M_n$ of the molecular weight distribution is less than 4, the n-heptane-soluble fraction of the polypropylene is less than 1%, and the shrinkage of the film in the longitudinal direction and in the transverse direction is less than 5%, and

TABLE

| | Film thickness μm | Modulus of elasticity DIN 532 457 longitudinal/ transverse N/mm² | Tensile strength DIN 53 455 longitudinal/ transverse N/mm² | Elongation at break DIN 53 455 longitudinal/ transverse % | Gloss DIN 67 530 | Shrinkage DIN 40 634 longitudinal/transverse % | Haze ASTM D 1003-52 % | Friction 14 days after production B side/ B' side | Scratch resistance Δ haze | High-temperature blocking characteristics N |
|---|---|---|---|---|---|---|---|---|---|---|
| E5 | 5 | 2600/4700 | 160/320 | 125/70 | 100 | 1.5/2.5 | 2.0 | 0.4/0.4 | 8 | 0.5 |
| E6 | 16 | 2400/4300 | 145/310 | 120/65 | 120 | 1.6/3.0 | 1.9 | 0.22/0.23 | 23 | 1.5 |
| CE1 | 16 | 2200/4100 | 140/300 | 160/60 | 100 | 5.7/5.5 | 2.5 | 0.24/0.27 | 28 | 1.8 |

E = Example; CE = Comparative Example
B side: roll side
B' side: corona or flame treatment side, if this treatment has been carried out

What is claimed is:

1. A biaxially oriented polypropylene single ply film wherein the mean isotactic block length of the polypropylene molecule between two structural chain defects is, as a statistical average, greater than 40, at least one ply on each side of the base ply comprising α-olefinic polymers.

12. The polypropylene film as claimed in claim 11, wherein the base ply contains a polypropylene whose n-heptane-insoluble fraction has a chain isotactic index, measured by means of $^{13}$C-NMR spectroscopy, of at least 96%.

13. The polypropylene film as claimed in claim 11, wherein the base ply contains a polypropylene whose $M_w/M_n$ is less than 3.0.

14. The polypropylene film as claimed in claim 11, wherein the base ply contains an antistatic agent.

15. The polypropylene film as claimed in claim 11, wherein the base ply contains a neutralizing agent and/or stabilizer.

16. The polypropylene film as claimed in claim 11, wherein the thickness of the film is 4 to 100 μm, the base ply accounting for about 40 to 60% of the total thickness.

17. A polypropylene film as claimed in claim 11, in the form of a packaging film.

18. A polypropylene film as claimed in claim 11, in the form of a laminating film.

19. A process for the production of a polypropylene film as claimed in claim 11, wherein the polymers of the individual plies are heated, compressed and melted in an extruder, the melt corresponding to the individual plies of the film are extruded together simultaneously through a sheet die and the film thus obtained is drawn off on a take-off roll, said film cooling and solidifying and the prefilm thus obtained being oriented longitudinally and transversely, the orientation in the longitudinal direction being effected with a longitudinal stretching ratio of 3:1 to 9:1 and that in the transverse direction is effected with a transverse stretching ratio of 4:1 to 12:1.

* * * * *